July 31, 1928.
W. S. EVANS
1,679,327
CROWN BLOCK
Filed Aug. 11, 1927
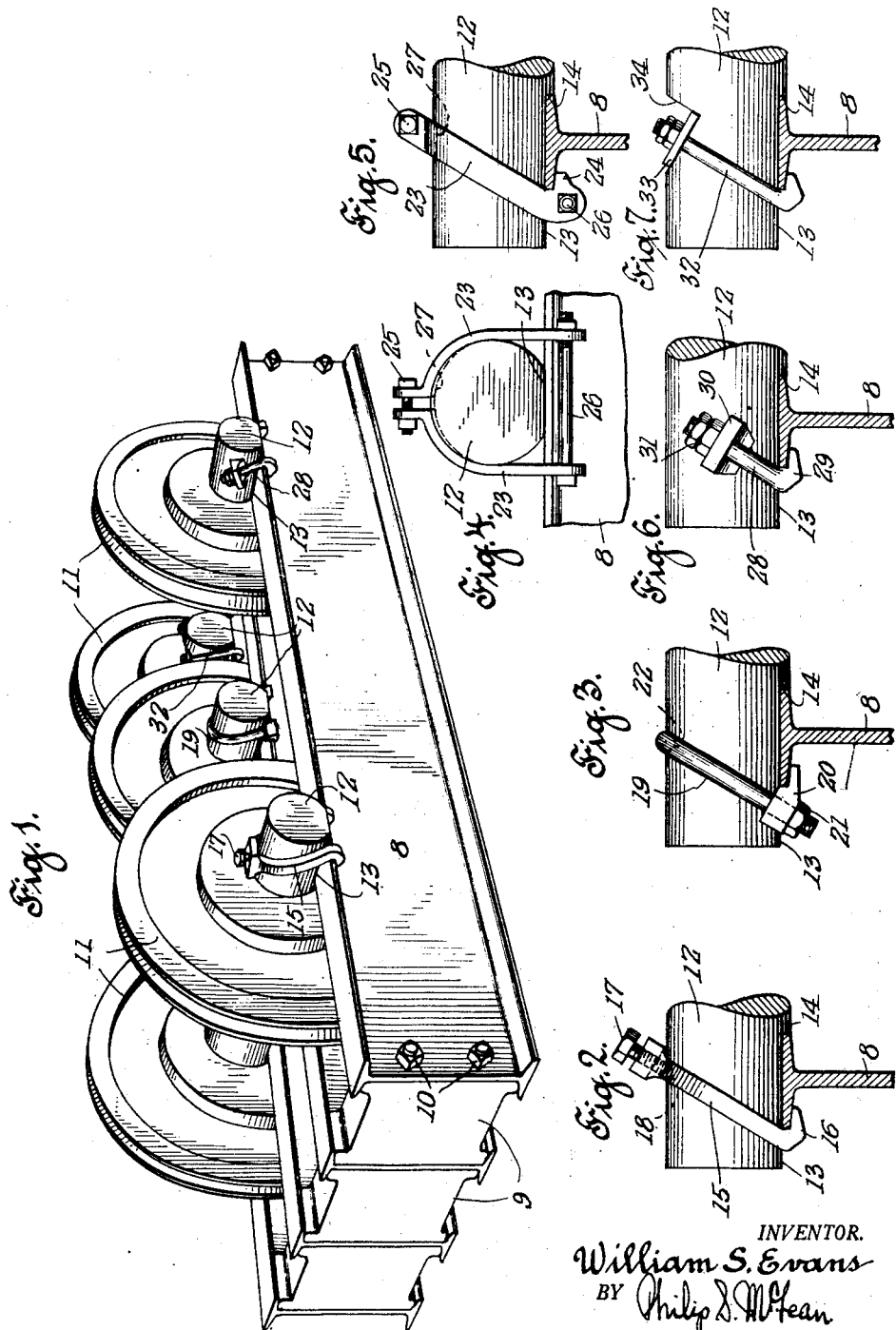
INVENTOR.
William S. Evans
BY Philip S. McLean
ATTORNEY Patented July 31, 1928.

UNITED STATES PATENT OFFICE.

1,679,327

WILLIAM S. EVANS, OF PALISADES PARK, NEW JERSEY, ASSIGNOR TO LUCEY MANUFACTURING CORPORATION OF TENNESSEE, OF CHATTANOOGA, TENNESSEE, A CORPORATION OF TENNESSEE.

CROWN BLOCK.

Application filed August 11, 1927. Serial No. 212,213.

The crown blocks used for deep well drilling operations need especially to be rigid and firm and it is highly desirable that the sheaves be quickly adjustable to line up with the hole and with the tackle.

The objects of the invention are to provide a crown block which will embody these characteristics especially and in which the possibilities for adjustment will be accomplished without weakening the structure.

In certain prior constructions the sheaves have been mounted on shafts secured adjustably in place on the beams by hook bolts extending through the shafts. This is a desirable construction from the standpoints of simplicity and ease of adjustment, but the extension of the bolts through the shafts has a tendency to produce hidden weaknesses in the structure.

In the present invention the desired objects are attained, the ease of adjustment is retained and the danger of hidden weaknesses is overcome by securing the sheave supporting shafts adjustably on the beams by hook clips which extend about or around instead of through the shafts.

The invention is capable of embodiment in many different forms as will be seen by reference to the accompanying drawing, wherein a number of different possible forms are illustrated.

Figure 1 is a perspective view of one of the complete crown blocks showing several of the new type of shaft securing clips in actual use.

Figure 2 is a broken side view of a reversed U form of clip with beam engaging hooks at the lower ends of the same and a shaft engaging bolt at the upper end.

Figure 3 illustrates a similar form of clamp but with separate beam engaging lugs secured by nuts to the lower ends of the same.

Figures 4 and 5 are end and side views illustrating a split form of reversed U clamp.

Figure 6 is a side view illustrating the use of short hook bolts engaged with lugs on the sides of the shaft.

Figure 7 is a similar view illustrating the use of longer hook bolts engaging a cross bar set in a notch in the top of the shaft.

In Figure 1 the frame of the crown block is shown made up of four parallel I-beams 8 secured in spaced parallel relation by spacer blocks 9 interposed between the end portions of the beams and all tied together by through bolts 10.

The various sheaves are indicated at 11 rotatably mounted on short supporting shafts 12, resting on top of the beams and bridging the spaces therebetween. These shafts are illustrated as having flattened lower faces 13 bearing on the flanged heads of the beams and as having shoulders 14 engaging the inner edges of the flanges. These shoulders enable the shafts to act as spacers for the intermediate portions of the beams.

The first form of securing the clamp shown particularly in Figure 2, consists of a heavy U-shaped strap 15 engaged in reversed relation over the top of the shaft and inclined downwardly and outwardly so as to bring the hooks 16 on the lower ends of the same into engagement beneath the outer top flange of the beam. A heavy set bolt 17 in the head of this clamp engages in a notch or shallow seat 18 in the top of the shaft spaced inward from the end of the shaft a distance to give the proper incline to the clamp.

The effect of this construction, it will be seen, is to pull the shaft tight down on the top of the beam with an angular force which tends to bind the beams against the shoulders 14 on the under sides of the shaft. It will be noted that the clamping force is applied to the solid metal of the shaft directly above the center of the beam.

A reversed yoke or U-strap form of clamp is shown at 19 in Figure 3, in which the flange engaging hooks are formed separately as lugs 20 sliding over the lower ends of the yoke and adjustably secured by nuts 21. The yoke is prevented from slipping by having the arch or loop in the top of the same seat directly in the notch 22 provided in the top of the shaft. This construction is of less overall height than the first and by its action hugs the shaft more closely than the first.

The device shown in Figures 4 and 5 differs from the first two forms primarily in that the reversed U clamp is made of two companion clamp members 23 having flange engaging hooks 24 at their lower ends and secured together at top and bottom by bolts 25, 26 exerting their force to pull the clamp parts together about the shaft and at the same time to draw the shaft down firmly on the beam. In this construction also the top of the clamp engages in a notch 27 in the top of the shaft to prevent slippage and to give the clamp a proper grip on the shaft.

In Figure 6 separate bolts 28 are disposed at the sides of the shaft having hooks 29 at their lower ends engaging the flange of the beam. These bolts extend downwardly at the proper angle through lugs 30 provided on the sides of the shaft and the nuts 31 on the upper ends of the bolts by bearing on top of the lugs serve to apply the necessary anchoring force.

Instead of providing lugs for the tie bolts as in Figure 6, the bolts may be made longer, as shown at 32 in Figure 7, and may be run up through cross straps 33 entered in suitable notches 34 in the top of the shaft.

All the several forms of the invention have the general effect of reinforcing and strengthening the shaft, rather than weakening it. This is particularly true of the structure shown in Figures 2, 3, 4, 5 and 7 because in all of these the clamps exert a binding force about the shaft. In all forms of the invention also the securing bolts or nuts are fully accessible and can be readily manipulated one way or the other. The clamp structures are relatively simple, are particularly sturdy in design and do not require for their use, any extensive or expensive boring or machining of the shaft. Upon loosening the bolt or nuts the shaft can be slid along the frame beams so as to center or locate the sheave wherever desired.

The shaft rests directly on the beams, making it possible to slide the entire sheave structure very easily after the securing yokes at the opposite ends of the shaft have been loosened sufficiently to make the hooks on the ends of the yokes let go their hold on the flanges of the beams. The inclined bolt members at opposite sides of the shaft have the effect of confining and securing the shaft against any rolling tendency on the supporting beams.

What is claimed is:

1. In a crown block, the combination of spaced parallel frame beams, a supporting shaft resting on said beams, a sheave rotatably mounted on said shaft, oppositely inclined yokes engaged over opposite end portions of said shaft, hooks on the ends of said yokes engaged beneath the outer flanges of the supporting beams and screw means for forcing said hooks into holding engagement with the flanges and the yoke structures gripped about the shaft.

2. In a crown block, spaced supporting beams, a sheave supporting shaft directly resting on said beams and slidable to different positions therealong, a sheave journaled on said shaft, bolt members having interlocking engagement at their upper ends with the shaft and extending downwardly therefrom at oposite sides of the shaft on inclines sloping toward the opposite ends of the shaft, hooks on the lower ends of said bolt members engaging beneath the outer flanges of the beams and screw means on said bolt members for seating the hooks in gripping engagement with the flanges and the bolt members in confining relation at the sides of the shaft.

In testimony whereof I affix my signature.

WILLIAM S. EVANS.